United States Patent
Shirasaki et al.

(10) Patent No.: US 6,878,429 B2
(45) Date of Patent: Apr. 12, 2005

(54) SEALING MEMBER FOR DEVELOPER CONTAINER

(75) Inventors: Hirotaka Shirasaki, Fukui (JP); Yozo Okawa, Fukui (JP); Yasuhisa Yamamoto, Fukui (JP); Daisuke Wakabayashi, Fukui (JP)

(73) Assignee: Shirasaki Corporation, Fukui (JP)

( * ) Notice: Subject to any disclaimer, the term of this patent is extended or adjusted under 35 U.S.C. 154(b) by 0 days.

(21) Appl. No.: 10/178,218

(22) Filed: Jun. 25, 2002

(65) Prior Publication Data

US 2003/0096080 A1 May 22, 2003

(30) Foreign Application Priority Data

Nov. 16, 2001 (JP) .................................. 2001-351941

(51) Int. Cl.[7] ............................................... B32B 3/04
(52) U.S. Cl. ...................... 428/121; 428/124; 399/102; 399/103; 399/106
(58) Field of Search ................................ 428/121, 124; 399/102, 106, 103

(56) References Cited

U.S. PATENT DOCUMENTS 6,484,000 B1 * 11/2002 Ogawa et al. .............. 399/106

* cited by examiner

*Primary Examiner*—Harold Pyon
*Assistant Examiner*—Jane Rhee
(74) *Attorney, Agent, or Firm*—Smith, Gambrell & Russell, LLP

(57) ABSTRACT

A sealing member for sealing a slenderly extending developer outflow opening formed in a container accommodating a developer. The sealing member includes a first film strip formed from a longitudinally stretched plastic film, and a second film strip formed from a similarly longitudinally stretched plastic film. The first film strip and the second film strip are bonded to each other as required.

6 Claims, 4 Drawing Sheets

SEALING MEMBER FOR DEVELOPER CONTAINER

FIELD OF THE INVENTION

This invention relates to a sealing member for sealing a slenderly extending developer outflow opening formed in a container accommodating a developer.

Description of the Prior Art

As is well known, an electrostatic process image forming machine, such as an electrostatic printer, copier, or facsimile, of the type having a development unit detachably mounted at a required position within a housing is widely put to practical use. The development unit is detachably mounted alone at the required position within the housing, or is combined with a photoconductor drum unit to constitute a process unit, which is detachably mounted at the required position within the housing. The development unit includes a development frame, which defines a development chamber mounted with developer applicator means, and a container combined with the development frame. The developer applicator means has a development sleeve holding a developer on a circumferential surface thereof and adapted to apply the developer onto an electrostatic latent image to be developed, i.e., the electrostatic latent image formed on the photoconductor drum. The container accommodates the developer which may be a one-component developer comprising only a toner, or a two-component developer comprising a toner and carrier particles. A developer outflow opening, which extends in an elongated manner in the direction of the central axis of the development sleeve, is formed in the container. The developer in the container is supplied to the development chamber through the developer outflow opening. The developer outflow opening of the container is sealed with a sealing member in order to prevent the developer, accommodated in the container, from leaking through the developer outflow opening before the development unit is mounted in the housing and actually used.

The sealing member for sealing the developer outflow opening of the container is normally composed of a film strip formed from a suitable plastic film. The film strip has a first portion extending slenderly, and a second portion folded over the first portion and extending along the first portion. The second portion is provided with a pull end portion protruding beyond the free edge of the first portion. The first portion of the film strip is placed so as to cover the developer outflow opening, and is bonded to the periphery of the developer outflow opening to seal the developer outflow opening. With the container being combined with the development frame as required, the pull end portion of the film strip is extended outward through a suitable slit formed in the side wall of the development frame. To unseal the developer outflow opening, the pull end portion of the film strip is gripped and pulled to peel the first portion of the film strip from the periphery of the developer outflow opening sequentially, starting at its folded-back edge, and release the film strip form the container.

The conventional sealing member of the foregoing configuration has the following problems to be solved: Once the developer in the container is consumed, a developer may be filled again into the container, and where necessary, the developer applicator means may be repaired or replaced, followed by reusing the development unit. Particularly in this case, it is common practice to put some testing developer into the development chamber defined in the development frame, mount this development unit at a required position of the housing of the image forming machine for testing, and examine whether the development unit functions as required or not. If this examination has been carried out, it is extremely difficult, although not impossible, to remove the developer, which has been placed in the development chamber for examination, completely from the development chamber. As a result, some developer adheres onto the outer surface of the second portion of the film strip constituting the sealing member (i.e., the reverse of the inner surface of the second portion opposed to the first portion), and some developer penetrates between the outer surface of the first portion of the film strip and the inner surface of the second portion. When the pull end portion of the film strip is pulled to release the film strip from the container for the purpose of reusing such a development unit, it is highly like that the developer remaining on the outer surface of the second portion pulled out of the container will scatter to the surroundings, or adhere to an operator's hand or clothes. In pulling the pull end portion of the film strip to release the first portion of the film strip progressively from the container, the folded-back site of the first portion and the second portion is displaced progressively toward one side of the container. In accordance with this motion, the developer remaining between the outer surface of the first portion of the film strip and the inner surface of the second portion is progressively accumulated in the folded-back region between the outer surface of the first portion of the film strip and the inner surface of the second portion to grow to a mass of a considerable thickness, more specifically, of a larger thickness than the width of the slit formed in the side wall of the development frame. Because of this mass, it may be difficult to withdraw the film strip through the slit formed in the side wall of the development frame.

SUMMARY OF THE INVENTION

A principal object of the present invention is to provide a novel and improved sealing member which prevents or suppresses scatter of a testing developer to the surroundings, or adhesion of the developer to an operator's hand or clothes, while permitting an unsealing operation sufficiently easily, when a developer outflow opening is unsealed in a test conducted by filling a certain amount of the testing developer into a development chamber defined in a development frame, mounting such a development unit at a required position of a housing of an image forming machine for testing, and examining whether the development unit functions as required or not.

In the present invention, a sealing member for attaining the above-described principal object is composed not of a single film strip, but of two film strips bonded to each other as required, namely, a first film strip and a second film strip.

That is, according to the present invention, there is provided, as a sealing member for attaining the principal object, a sealing member for sealing a slenderly extending developer outflow opening formed in a container accommodating a developer, comprising:

a first film strip formed from a plastic film stretched longitudinally; and a second film strip formed from a plastic film similarly stretched longitudinally, and wherein:

the first film strip has a first portion extending slenderly, a second portion folded over the first portion and extending along the first portion, and a pull end portion continued from the second portion, the second portion is narrower than the first portion and is located at a widthwise center of the first portion, and the pull end portion extends beyond a free edge of the first portion;

the second film strip also has a first portion extending slenderly, a second portion folded over the first portion and extending along the first portion, and a pull end portion continued from the second portion, the second portion is narrower than the first portion and is located at a widthwise center of the first portion, and the pull end portion extends beyond a free edge of the first portion;

the first portion of the first film strip is placed so as to cover the developer outflow opening, and is bonded to a periphery of the developer outflow opening;

the second portion of the second film strip is superposed on the second portion of the first film strip, and is bonded thereto;

the pull end portion of the second film strip is superposed on the pull end portion of the first film strip, and is bonded thereto; and the first portion of the second film strip is superposed on the first portion of the first film strip via the second portion of the second film strip and the second portion of the first film strip, and the first portion of the second film strip is bonded to the first portion of the first film strip on widthwise opposite sides of the second portion of the second film strip and the second portion of the first film strip.

The width of the second portion of the first film strip and the width of the second portion of the second film strip are preferably nearly the same as the width of the developer outflow opening. Preferably, the sealing member includes a plastic sheet strip having formed therein an opening corresponding to the developer outflow opening, and the first portion of the first film strip is bonded to the periphery of the developer outflow opening via the sheet strip. Advantageously, the sheet strip is bonded to the periphery of the developer outflow opening via a double coated adhesive tape, and the first portion of the first film strip is bonded to the sheet strip via a double coated adhesive tape. Preferably, the second portion and the pull end portion of the second film strip are bonded to the second portion and the pull end portion of the first film strip via a central double coated adhesive tape extending continuously, and widthwise opposite side areas of the first portion of the second film strip are bonded to widthwise opposite side areas of the first portion of the first film strip via opposite side double coated adhesive tapes extending along the widthwise opposite side areas of the first portion separately from the central double coated adhesive tape.

DETAILED DESCRIPTION OF THE PREFERRED EMBODIMENTS

A preferred embodiment of a sealing member according to the present invention will now be described in more detail with reference to the accompanying drawings.

Figure 1:
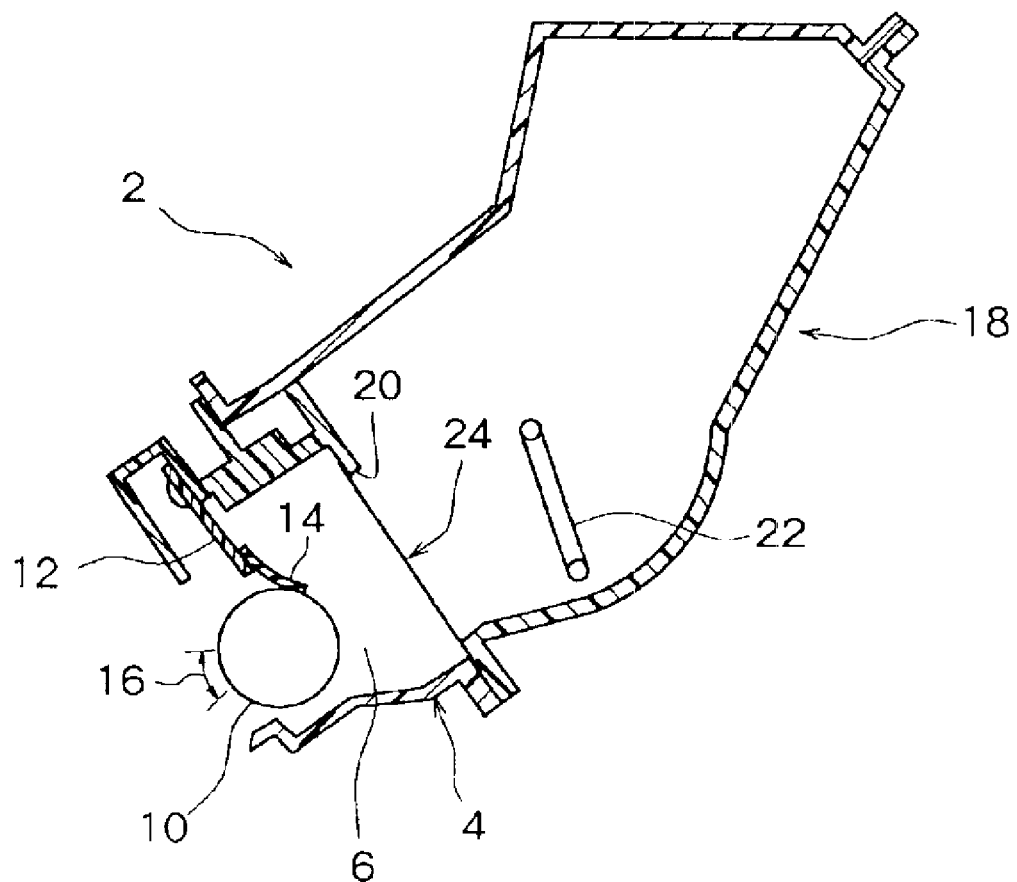
FIG. 1 is a schematic sectional view showing a typical example of a development unit to which a sealing member constructed in accordance with the present invention is applied.

FIG. 1 shows a typical example of a development unit to which a preferred embodiment of a sealing member constructed in accordance with the present invention is applied. The development unit, entirely indicated at the numeral 2, has a development frame 4, and a development chamber 6 is defined within the development frame 4. Development applicator means, which is composed of a development sleeve 10 rotatably mounted between opposite side walls (not shown in FIG. 1) of the development frame 4, is disposed within the development chamber 6. The front surface of the development frame 4 (i.e., the left side surface in FIG. 1) is open, and the circumferential surface of the development sleeve 10 is partly exposed outwardly of the development frame 4. A magnet member (not shown) is disposed in the development sleeve 10. A developer regulating blade 14, fixed to the development frame 4 via a connecting member 12, is also disposed within the development chamber 6. A free end portion of the developer regulating blade 14, which can be formed of synthetic rubber, is pressed against the surface of the development sleeve 10. The development sleeve 10 is rotationally driven counterclockwise in FIG. 1, holds a developer within the development chamber 6 onto its circumferential surface by the magnetic attractive force of the magnet member, and transports the developer to a development zone 16 defined outwardly of the development frame 4. In the development zone 16, the development sleeve 10 applies the developer to an electrostatic latent image formed on the circumferential surface of a rotating drum (not shown) to develop the electrostatic latent image into a toner image. The developer may be a one-component developer composed only of a toner, or a two-component developer composed of a toner and carrier particles. The developer regulating blade 14 restricts a layer of the developer, held on the circumferential surface of the development sleeve 10 and transported to the development zone 16, to a predetermined thickness.

The development unit 2 includes a developer container 18 mounted on the development frame 4. A developer outflow opening 20, slenderly extending in a direction perpendicular to the sheet face of FIG. 1, is formed in a front surface (left side face in FIG. 1) of the container 18. A developer delivery member 22 is disposed within the container 18. The developer delivery member 22 is rotatably mounted between both side walls (not shown) of the container 18. A developer (not shown for clarity of illustration in FIG. 1) is accommodated within the container 18, and when the developer delivery member 22 is rotationally driven clockwise, the developer within the container 18 is delivered into the development chamber 6 through the developer outflow opening 20.

However, the above-described constitution in the illustrated development unit 2 is well known among people skilled in the art, so that a detailed description of the constitution of the development unit 2 is omitted herein.

Figure 2:
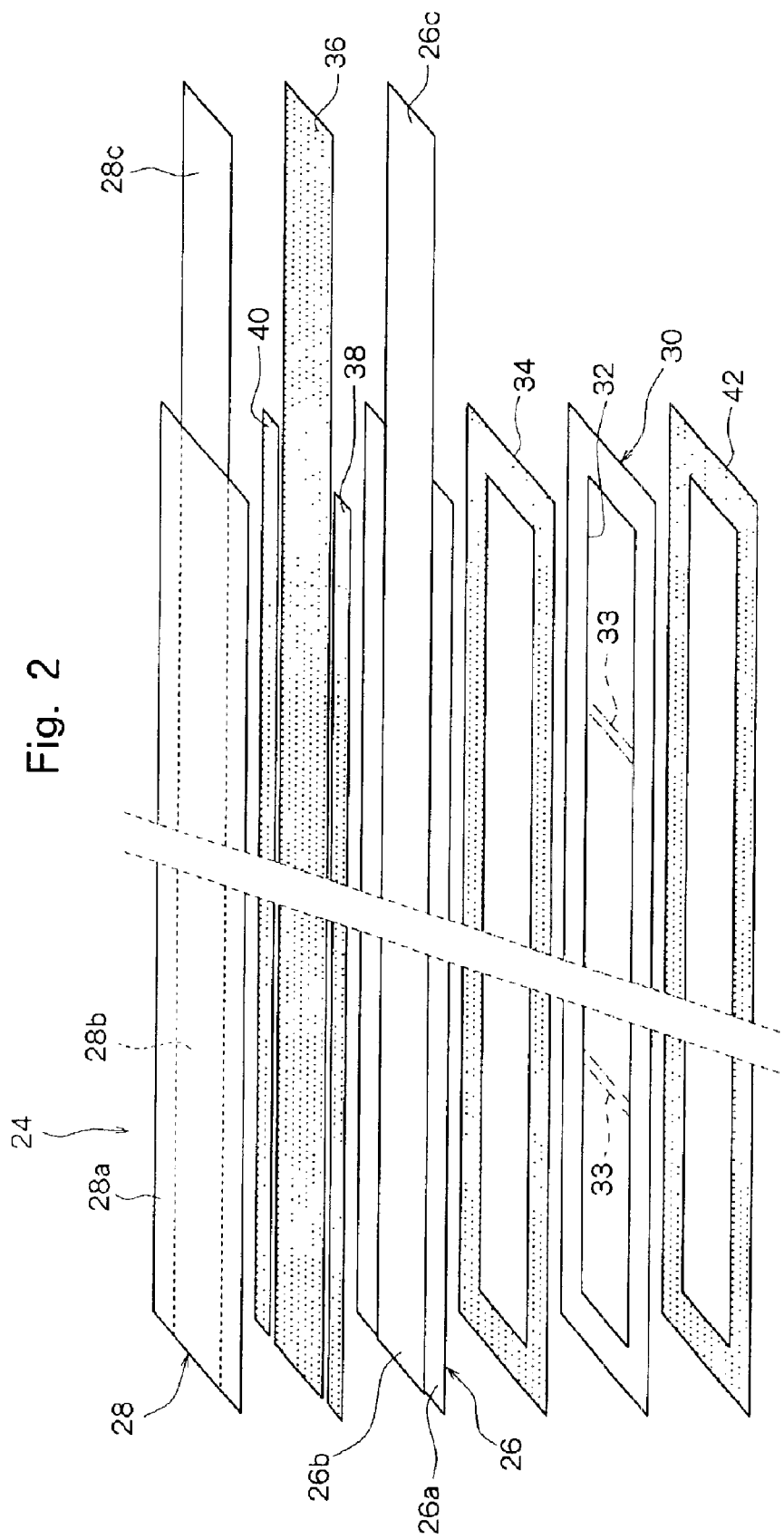
FIG. 2 is an exploded perspective view showing a preferred embodiment of the sealing member constructed in accordance with the present invention.
Figure 3:
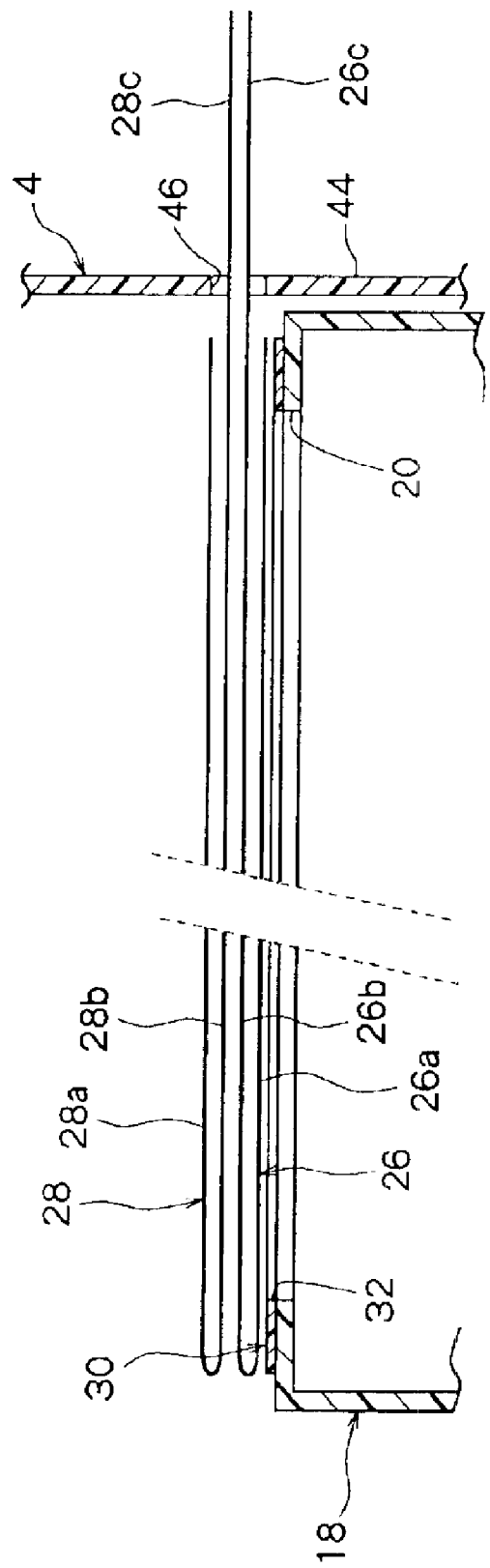
FIG. 3 is a schematic sectional view showing a state of sealing a developer outflow opening of a container with the sealing member shown in FIG. 2.

In the development unit 2, the developer outflow opening 20 of the container 18 is sealed with a sealing member 24 in order to prevent leakage and scatter of the developer until the development unit 2 alone, or a process unit comprising the development unit 2 combined with a rotating drum unit (not shown), is mounted at a predetermined position within a housing (not shown) of an image forming machine and begins to be used. FIGS. 2 and 3 show the preferred embodiment of the sealing member constructed in accordance with the present invention. The illustrated sealing member 24 includes a first film strip 26, and a second film strip 28. The first film strip 26 and the second film strip 28 have been longitudinally stretched and longitudinally oriented. Thus, it is important for these strips to have a considerably great resistance force against tear in a width direction, but to be torn sufficiently easily in a longitudinal direction. For example, these strips can be formed from a longitudinally stretched polypropylene film.

The first film strip 26 has a first portion 26a extending slenderly, a second portion 26b folded over the first portion 26a and extending slenderly along the first portion 26a, and a pull end portion 26c continued from the second portion 26b. The length of the first portion 26a is somewhat larger than the length of the developer outflow opening 20 formed in the container 18, and the width of the first portion 26a is somewhat larger than the width of the developer outflow opening 20 formed in the container 18. The width of the second portion 26b folded over the first portion 26a is smaller than the width of the first portion 26a. The second portion 26b is located at the center of the first portion 26a in the width direction, and is extended along the widthwise center of the first portion 26a. The width of the second portion 26b may be substantially the same as the width of the developer outflow opening 20 formed in the container 18. The length of the second portion 26b is the same as the length of the first portion 26a. The pull end portion 26c, continued from the second portion 26b, is extended beyond the free edge of the first portion 26a (i.e., one edge of the first film strip 26). Preferably, the pull end portion 26c is aligned with the second portion 26b in the width direction, and has the same width as the width of the second portion 26b.

The second film strip 28 may also have substantially the same shape as the first film strip 26, and has a first portion 28a extending slenderly, a second portion 28b folded over the first portion 28a and extending slenderly along the first portion 28a, and a pull end portion 28c continued from the second portion 28b.

The illustrated sealing member 24 further includes a slenderly extending sheet strip 30. Advantageously, the sheet strip 30 is formed from a suitable plastic sheet such as polyethylene terephthalate. A slenderly extending opening 32 is formed in the sheet strip 30. Advantageously, the opening 32 corresponds to the developer outflow opening 20 formed in the container 18, and more specifically, has substantially the same shape as the developer outflow opening 20. If a reinforcement rib extending in a width direction is formed, or a plurality of the reinforcement ribs spaced longitudinally are formed, in the developer outflow opening 20, a reinforcement rib or a plurality of the reinforcement ribs (two reinforcement ribs 33 are indicated by two-dot chain lines in FIG. 2) can be formed in the opening 32 of the sheet strip 30 in correspondence with the above-mentioned reinforcement rib(s).

With further reference to FIGS. 2 and 3, the first portion 26a of the first film strip 26 is bonded onto one surface of the sheet strip 30 (upper surface in FIGS. 2 and 3), and the second portion 28b and pull end portion 28c of the second film strip 28 are bonded onto the second portion 26b and pull end portion 26c of the first film strip 26. (Thus, the first film strip 26 and the second film strip 28 are laminated, with the second portions 26b and 28b facing each other. Whereas the first portion 26a of the first film strip 26 and the first portion 28a of the second film strip 28 are laminated via the second portion 26b of the first film strip 26 and the second portion 28b of the second film strip 28.) Furthermore, the opposite side edge areas of the first portion 26a of the first film strip 26 and the opposite side edge areas of the first portion 28a of the second film strip 28, namely, the opposite side edge areas that are located widthwise outwardly of the opposite side edges of the second portions 26b and 28b and thus are directly laminated, are bonded to each other. In this manner, the sealing member 24 is constructed.

Figure 4:
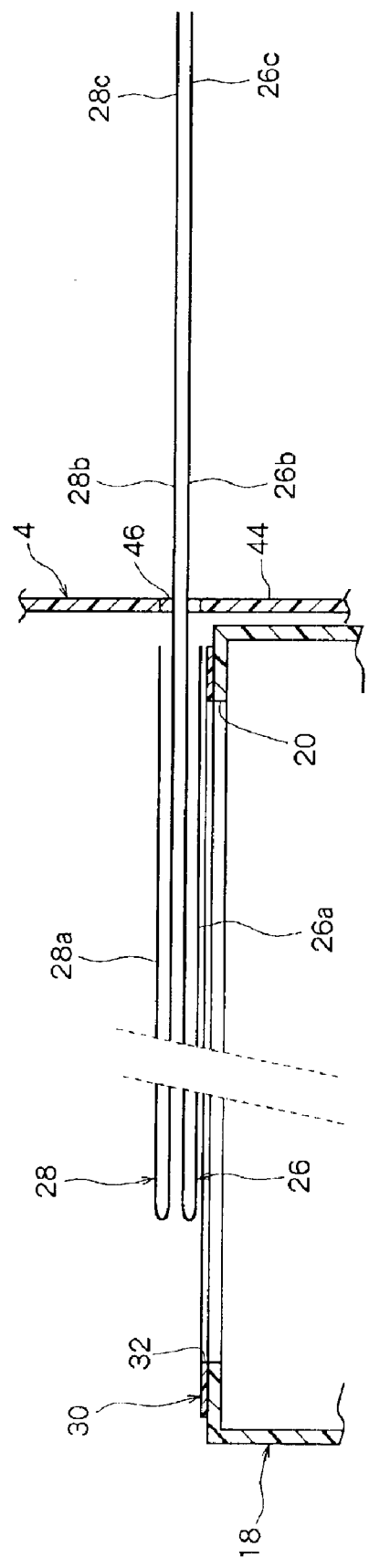
FIG. 4 is a schematic sectional view for illustrating the behaviors of the sealing member when unsealing the developer outflow opening of the container.

As clearly shown in FIG. 2, the first portion 26a of the first film strip 26 is preferably bonded to the sheet strip 30 via a double coated adhesive tape 34 having substantially the same shape as the sheet strip 30. The second portion 26b and pull end portion 26c of the first film strip 26, and the second portion 28b and pull end portion 28c of the second film strip 28 are preferably bonded together via a double coated adhesive tape 36 slenderly extending along them. The opposite side edge areas of the first portion 26a of the first film strip 26 and the opposite side edge areas of the first portion 28a of the second film strip 28 are preferably bonded via double coated adhesive tapes 38 and 40, which extend along these opposite side edge areas, separately from the double coated adhesive tape 36. In FIGS. 3 and 4, the illustration of the double coated adhesive tapes 34, 36, 38 and 40 is omitted for clarity of the drawings.

In the sealing member 24 described above, as shown in FIG. 3, the sheet strip 30 is bonded to the container 18, with the opening 32 of the sheet strip 30 in alignment with the developer outflow opening 20 formed in the container 18. In this manner, the developer outflow opening 20 of the container 18 is sealed. Bonding of the sheet strip 30 to the container 18 is preferably performed using a double coated adhesive tape 42 (FIG. 2) having substantially the same shape as the sheet strip 30. In FIGS. 3 and 4, the illustration of the double coated adhesive tape 42 is also omitted for clarity of the drawings. The pull end portion 26c of the first film strip 26 and the pull end portion 28c of the second film strip 28 extend beyond one side surface of the container 18. When the container 18 is mounted on the development frame 4, the pull end portion 26c of the first film strip 26 and the pull end portion 28c of the second film strip 28 are inserted through a slit 46 formed in one side wall 44 of the development frame 4, and are extended outward.

To use the development unit 2 by mounting it at a required position within the housing of the image forming machine, the pull end portion 26c of the first film strip 26 and the pull end portion 28c of the second film strip 28, which extend outward from the one side wall 44 of the development frame 4, are pulled before or after mounting of the development unit 2. By so doing, a tensile force is transmitted from the second portion 26b of the first film strip 26 and the second portion 28b of the second film strip 28 to the widthwise center of the first portion 26a of the first film strip 26 and the widthwise center of the first portion 28a of the second film strip 28. As will be clearly understood by comparative reference to FIGS. 3 and 4, the widthwise central areas of the first portions 26a and 28a are torn from their opposite side areas progressively toward the free edges of the first portions 26a and 28a, starting at the folded-back sites of the first portions 26a and 28a and the second portions 26b and 28b, in both of the first film strip 26 and the second film strip 28. As a result, the widthwise central areas of the first portions 26a and 28a are separated from the sealing member 24, together with the pull end portions 26c and 28c and the second portions 26b and 28b. At this time, the lengthwise opposite ends of the widthwise central area of the first portion 26a of the first film strip 26 are peeled from the lengthwise opposite ends of the sheet strip 30. When the widthwise central areas of the first portions 26a and 28a are separated from the sealing member 24, together with the pull end portions 26c and 28c and the second portions 26b and 28b in the first film strip 26 and the second film strip 2B, the portion that has covered the developer outflow opening 20 of the container 18 is no more existent, so that the developer outflow opening 20 is uncovered.

The following facts should be noted in connection with the illustrated sealing member 24 constructed in accordance with the present invention: First, prior to shipment of the development unit 2, accordingly, with the developer outflow opening 20 of the container 18 being sealed with the sealing member 24, assume that a development test has been conducted with the use of the development unit 2 by charging some developer into the development chamber 6. In this case, one surface of the first portion 28a of the second film strip 28 (i.e., upper surface in FIGS. 2 to 4) is exposed to the interior of the development chamber 6. Thus, some developer deposits on this one surface. However, the one surface of the first portion 28a of the second film strip 28, as will be clearly understood by reference to FIG. 4, is abruptly folded back from an upwardly facing state to a downwardly facing state in FIGS. 2 to 4, when the pull end portion 26c of the first film strip 26 and the pull end portion 28c of the second film strip 28 are pulled to uncover the developer outflow opening 20. Hence, the developer present on the one surface of the first portion 28a of the second film strip 28 is effectively released therefrom, and dropped into the container 1B or the development chamber 6. Consequently, the developer is sufficiently prevented or restrained from being carried with the first portion 28a of the second film strip 28, and brought out of the development unit 2, scattering to the surroundings or staining the operator's hand or clothing. Secondly, the second portion 26b of the first film strip 26 and the second portion 28b of the second film strip 28 are bonded together, while the opposite side areas of the first portion 26a of the first film strip 26 and the opposite side areas of the first portion 28a of the second film strip 28 are bonded together. Thus, no development penetrates between the first portion 26a and the second portion 26b of the first film strip 26, between the second portion 26b of the first film strip 26 and the second portion 28b of the second film strip 28, or between the second portion 28b and the first portion 28a of the second film strip 28. Hence, there is no risk that the developer will accumulate at the folded-back sites of the first film strip 26 and the second film strip 28 of the sealing member 24, resulting in an excessive thickness of the developer layer at particular sites, when the developer outflow opening 20 is uncovered. Consequently, it is not impossible or difficult to withdraw required portions of the first film strip 26 and the second film strip 28 through the slit 46 formed in the one side wall 44 of the development frame 4.

We claim:

1. A sealing member for sealing a slenderly extending developer outflow opening formed in a container accommodating a developer, comprising:

a first film strip formed from a plastic film stretched longitudinally; and a second film strip formed from a plastic film stretched longitudinally, and wherein:

the first film strip has a first portion extending slenderly, a second portion folded over the first portion and extending along the first portion, and a pull end portion continued from the second portion, the second portion is narrower than the first portion and is located at a widthwise center of the first portion, and the pull end portion extends beyond a free edge of the first portion;

the second film strip also has a first portion extending slenderly, a second portion folded over the first portion and extending along the first portion, and a pull end portion continued from the second portion, the second portion is narrower than the first portion and is located at a widthwise center of the first portion, and the pull end portion extends beyond a free edge of the first portion;

the first portion of the first film strip is placed so as to cover the developer outflow opening, and is adhesively bonded to a periphery of the developer outflow opening;

the second portion of the second film strip is superposed on the second portion of the first film strip, and is adhesively bonded thereto;

the pull end portion of the second film strip is superposed on the pull end portion of the first film strip, and is adhesively bonded thereto; and the first portion of the second film strip is superposed on the first portion of the first film strip via the second portion of the second film strip and the second portion of the first film strip, and the first portion of the second film strip is adhesively bonded to the first portion of the first film strip at widthwise opposite side areas.

2. The sealing member of claim 1, wherein a width of the second portion of the first film strip and a width of the second portion of the second film strip are nearly the same as a width of the developer outflow opening.

3. The sealing member of claim 1, which includes a plastic sheet strip having formed therein an opening corresponding to the developer outflow opening, and wherein the first portion of the first film strip is bonded to a periphery of the developer outflow opening via the sheet strip.

4. The sealing member of claim 3, wherein the sheet strip is bonded to the periphery of the developer outflow opening via a double coated adhesive tape, and the first portion of the first film strip is bonded to the sheet strip via a double coated adhesive tape.

5. The sealing member of claim 1, wherein the second portion and the pull end portion of the second film strip are bonded to the second portion and the pull end portion of the first film strip via a central double coated adhesive tape extending continuously, and the widthwise opposite side areas of the first portion of the second film strip are bonded to the widthwise opposite side areas of the first portion of the first film strip via opposite side double coated adhesive tapes extending along the widthwise opposite side areas of the first portion separately from the central double coated adhesive tape.

6. The sealing member of claim 1, wherein the widthwise opposite side areas of the first portions of both the first film strip and the second film strip remain on the container when the developer outflow opening is opened.

* * * * *